United States Patent [19]

Logan et al.

[11] Patent Number: 4,761,315
[45] Date of Patent: Aug. 2, 1988

[54] BLANK FOR USE IN A LENS PATTERN GENERATOR

[75] Inventors: David J. Logan, Glastonbury; Kenneth O. Wood, Ellington; William Hernandez, Madison, all of Conn.

[73] Assignee: Gerber Scientific Products, Inc., Manchester, Conn.

[21] Appl. No.: 896,840

[22] Filed: Aug. 14, 1986

[51] Int. Cl.⁴ .................... A61B 3/10; F16B 5/07
[52] U.S. Cl. ...................... 428/33; 428/192; 428/542.8; 33/200; 33/507; 351/159
[58] Field of Search ............ 428/192, 542.8, 704, 428/33, 698; 51/284 E, 284 R, 312, 262 R, 274, 277, 262.1, 262 T, 262 A; 351/159, 172, 177, 100, 101; 356/417; 16/223, 224, 365, 385; 33/200, 507; 350/243, 246, 247, 248, 250, 254, 417, 422

[56] References Cited

U.S. PATENT DOCUMENTS

| | | | |
|---|---|---|---|
| 3,077,282 | 2/1963 | Eggers | 16/224 |
| 3,740,857 | 6/1973 | Nerad | 33/200 |
| 4,050,192 | 9/1977 | Volk | 51/33 |
| 4,109,821 | 8/1978 | Lutz | 16/224 |
| 4,138,085 | 2/1979 | Bicskei | 51/277 |
| 4,227,349 | 11/1980 | Bicskei | 33/507 |
| 4,253,268 | 3/1981 | Mayr | 428/33 |
| 4,627,994 | 12/1986 | Welsch | 428/192 |
| 4,630,906 | 12/1986 | Bammert et al. | 351/159 |
| 4,656,590 | 4/1987 | Ace | 351/177 |
| 4,656,754 | 4/1987 | Cingone | 33/200 |
| 4,677,729 | 7/1987 | Morland et al. | 51/284 R |
| 4,686,798 | 8/1987 | Petty et al. | 51/284 R |

Primary Examiner—John E. Kittle
Assistant Examiner—Donald J. Loney
Attorney, Agent, or Firm—McCormick, Paulding and Huber

[57] ABSTRACT

A blank having a rectangular shaped body from which a lens pattern is cut to the desired size and shape of a frame lens opening is connected to other identical blanks to form a chain for continuous feeding to a lens pattern generator. The blanks have ball and socket hinge members symmetrically arranged on each edge with a ball hinge member on one edge being opposite a socket hinge member on the other edge. The hinge members are offset with respect to a plane passing through the center of the body between the top and bottom faces of the blank so that the pivot axis of the ball and socket hinge members on one edge is in the plane of the top face and the pivot axis of the ball and socket hinge members on the other edge is in the plane of the bottom face. The blanks are connected together in a like edge-to-like edge fashion and indicia provided to identify the nasal side of the blank alternates from side to side when the blanks are interconnected in a chain. Rack gears embossed in the margins of the bottom face are provided for complementary engagement with drive gears in a lens pattern generator to advance the blank along a travel path in the generator.

28 Claims, 3 Drawing Sheets

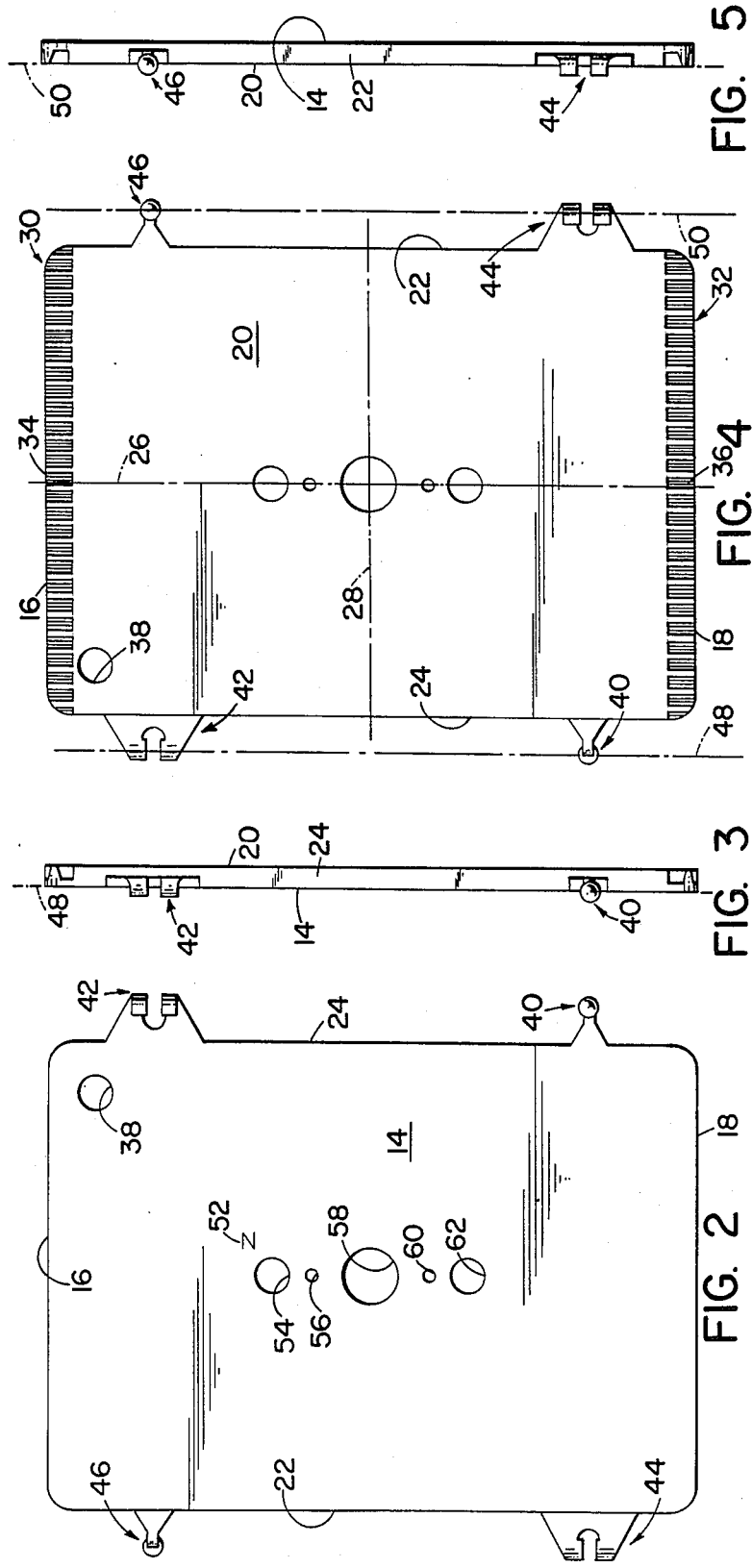

BLANK FOR USE IN A LENS PATTERN GENERATOR

BACKGROUND OF THE INVENTION

The present invention relates generally to a blank from which a lens pattern is cut, and deals more specifically with such a blank that is connectable to other like blanks to form a chain for continuous feeding to a lens pattern generator.

Eyeglass frame manufacturers conventionally provide a lens pattern having the size and shape of the frame lens opening for each eyeglass frame style produced by the manufacturer. An optician and/or lens grinder often maintains an inventory of lens patterns covering all of the different eyeglass frame styles sold or serviced. In one business practice in which an inventory is kept, an appropriate pattern is selected from the inventory and is used in cooperation with a lens grinding apparatus to contour the periphery of an optical lens to the size and shape of the lens opening of the associated frame.

The proliferation of different eyeglass frame styles has greatly increased inventory requirements both in terms of the large number of different lens patterns and the space requirements necessary to store the patterns. In addition, the number of manufacturers of eyeglass frames has substantially increased during recent years adding to the number of different patterns required in inventory.

In addition to the problems associated with keeping an inventory and the associated storage space requirements is the problem associated with the suitability of using a pattern from inventory for all eyeglass frames of one style. The advent of a large number of manufacturers has increased competition in the eyeglass frame market and has, in many instances, resulted in frames of lower cost and lower quality. Many times, the size and shape of the frame lens opening associated with a frame style is not consistent from frame-to-frame. Consequently, an optical lens peripherally contoured or edged using the lens pattern supplied for a given frame style may not properly fit the lens opening of an actual frame of that style.

Yet another problem occasionally associated with the business practice of using lens patterns supplied by the eyeglass frame manufacturers, especially in instances where the frames are manufactured off-shore and imported to the United States is that the patterns may become misdirected when shipped separately or may not be included with the frames when the patterns and frames are shipped together. If a pattern corresponding to a lost pattern is not in inventory, the frame generally cannot be easily fitted with an optical lens and consequently the optician and/or lens grinder incurs substantial incovenience and additional expense in fitting the optical lens to the frame.

Yet another problem sometimes associated with the use of a lens pattern is the pattern may become worn through usage and thereafter be an inaccurate guide. A lens cut from such a worn pattern may not properly fit its intended frame lens opening or may fit loosely and eventually fall out subjecting it to scratches, loss or breakage.

A solution to the above-mentioned problems associated with using a lens pattern for edging eyeglass lenses is to not supply any such patterns in advance of their need, but rather to generate such a pattern immediately before the edging operation by tracing the lens opening of the actual frame with which it is to be used. Tracing apparatus for generating information representative of the size and shape of a frame lens opening is disclosed in a copending application filed concurrently herewith entitled APPARATUS FOR TRACING THE LENS OPENING IN AN EYEGLASS FRAME Ser. No. 896624 and assigned to the same assignee as the present invention. The information provided by this tracing apparatus may then be utilized by a lens pattern generator to produce a pattern. Such a lens pattern generator is disclosed in another copending application filed concurrently herewith entitled "METHOD AND APPARATUS FOR MAKING A PATTERN FOR A LENS OPENING IN AN EYEGLASS FRAME Ser. No. 896615, Know'll U.S. Pat. No. 4,711,035" and assigned to the same assignee as the present invention.

To have a lens pattern for each of the eyeglass frames to be fitted during the course of a busy work day, it is necessary to produce the patterns in a relatively short time. Apparatus for producing large numbers of differently shaped patterns must necessarily have a high speed, be accurate and be as automated as possible. Consequently, a minimum amount of operator intervention in producing each pattern is a desirable goal. One way to achieve this, at least in part, is to provide a blank from which a lens pattern may be cut to the desired size and shape and having characteristics and features for automatic feeding to and positioning by a lens pattern generator such as described by the above-identified patent application, or similar apparatus, that cuts or otherwise forms the blank to the size and shape of the desired lens pattern.

An object of the present invention is therefore, to provide a blank, having the foregoing features, from which a lens pattern may be cut.

Another object of the invention is to provide a blank having features that permit its automatic feeding to a lens pattern generator.

A further object of the present invention is to provide a blank that may be interconnected to other like blanks to form a compactly packagable chain for high speed feeding to a lens pattern generator, and which blank once loaded in the generator is easily separable from the chain after it reaches its cutting station.

SUMMARY OF THE INVENTION

The present invention resides in a blank from which a lens pattern is cut to the size and shape of an eyeglass frame lens opening. The invention specifically resides in a blank that is useable in a lens pattern generator or other similar apparatus. The blank comprises a rectangularly shaped body having top and bottom major faces, first and second side edges parallel to and opposite one another and first and second end edges parallel to and opposite one another and perpendicular to the side edges. A series of drive elements located along each side edge of the body engage with drive means in the pattern generator to move the blank in a direction parallel to its side edges along a travel path in the generator.

The invention further resides in the blank having first hinge means located adjacent the first end edge and second hinge means located adjacent the second end edge and the similar blanks are arranged to be connected to one another to form a chain. In one specific embodiment, male and female hinge members are located on the first end edge and other male and female hinge members are located on the second end edge and the male member on one edge is opposite a female member on the other edge. The hinge members are arranged for snap engagement with other hinge members of another similar blank. The hinge members on the first end edge of one blank cooperate with the hinge members on the first end edge of a similar advance blank located adjacent the first end edge of the blank to permit the blank and the similar advance blank to rotate relative to one another about an axis parallel to the first end edge. In a similar manner, the hinge members on the second end edge of the one blank cooperate with the hinge members on the second end edge of a similar rear blank located adjacent the second end edge of the blank to permit the blank and the similar rear blank to rotate relative to one another about an axis parallel to the second end edge. The hinge members are located adjacent each end edge such that a plane passing through the axis of the hinge members associated with the first end edge and the axis of the hinge members associated with the second end edge is inclined with respect to the top and bottom faces. Because the respective axes of the hinge members adjacent each end edge are offset with respect to one another, it is possible to interconnect similar blanks in a first end edge-to-first end edge and second end edge-to-second end edge arrangement to form a chain so that the bottom faces of the interconnected blanks lie in a common plane when the blanks in the chain are extended edge-to-edge along a common reference plane. Such a chain is compactly packageable by folding the interconnected blanks in an alternating top face-to-top face and bottom face-to-bottom face arrangement. The resultant packaging arrangement of the chain is especially suited for automatic continuous feeding of blanks to a lens pattern generator.

The invention further resides in the blank having locating means for locating and orienting the blank in a desired orientation and at a predetermined position along the travel path in the pattern generator.

The invention still further resides in the blank having indicia for identifying the nasal side of the blank.

BRIEF DESCRIPTION OF THE DRAWINGS

Other objects, features and advantages of the present invention will be readily apparent from the following written description and claims taken in conjunction with the drawings wherein:

FIG. 2 is a diagrammatic top plan view of the blank of FIG. 1.

FIG. 3 is an elevational view of the right edge of the blank of FIG. 2.

FIG. 4 is a diagrammatic bottom plan view of the blank of FIG. 1.

FIG. 5 is an elevational view of the left edge of the blank of FIG. 2.

FIG. 6 is an elevational view of the nasal side of the blank of FIG. 2.

FIG. 7 is an elevational view of the non-nasal side of the blank of FIG. 2.

DETAILED DESCRIPTION OF THE PREFERRED EMBODIMENT

Figure 1:
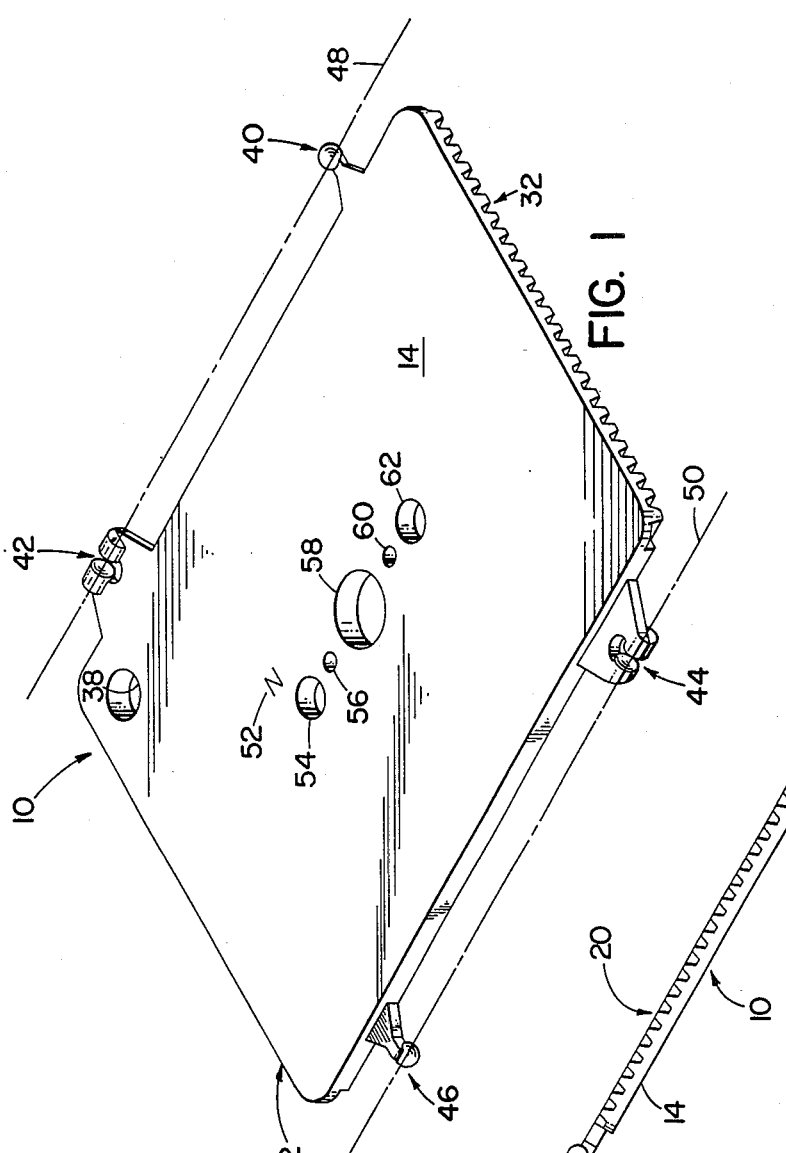
FIG. 1 is perspective view of a blank embodying the present invention.

Turning now to the drawings and referring to FIGS. 1-10, a blank embodying the present invention and particularly suitable for use in a lens pattern generator such as described in the above mentioned patent application, or similar apparatus is shown and designated 10. The blank 10 comprises a relatively thin rectangularly shaped body 12, a top major face 14, two spaced-apart substantially parallel side edges 16, 18, a bottom major face 20 and two spaced-apart substantially parallel end edges 22, 24 perpendicular to the side edges. A first axis 26 illustrated in FIG. 4 extends transversely between the two side edges 16,18 and is located substantially midway between and parallel to the two end edges 22,24. A second axis 28 also illustrated in FIG. 4 is normal to the first axis 26 and is located midway between and parallel to the two side edges 16,18 and extends transversely between the two end edges 22,24.

The blank 10 includes hinge members located adjacent each end edge 22,24 and arranged symmetrically about the axis 28. Hinge members 40,42 are located on the end edge 24 and hinge members 44,46 are located on the end edge 22. The hinge members are arranged for complementary snap engagement with hinges of similar blanks as explained in greater detail below. In one preferred embodiment, male hinge member 40 and female hinge member 42 are located on the end edge 24 and female hinge member 44 and male hinge member 46 are located on the end edge 22. The hinge members 42 and 46 are located opposite one another on end edges 24 and 22 respectively and hinge members 40 and 44 are located opposite one another on end edges 24 and 22 respectively. A pivot axis 48 parallel to the end edge 24 passes through the center or hinge point of the hinge members 40,42 and a pivot axis 50 parallel to the end edge 22 passes through the center or hinge point of the hinge members 44,46. The hinge members 40,42 are located adjacent to the end edge 24 so that the surface of the top face 14 is coplanar with a plane 43 passing through the pivot axis 48 of the hinge members 40,42. Likewise, the hinge members 44,46 are located adjacent the end edge 22 so that the surface of the bottom face 20 is coplanar with a plane 45 passing through the pivot axis 50 of the hinge members 44,46. In the preferred embodiment, the male and female hinge members comprise a ball and socket respectively and immediately adjacent interconnected blanks are separable when a force of approximately 0.1 foot pounds is applied to one blank relative to an immediately adjacent blank at the hinged connection between the blanks.

The blank 10 features a rack gear 30 molded in the margin along the side edge 16 and a rack gear 32 molded in the margin along the side edge 18 of the bottom face 20. The teeth of the rack gears 30,32 are arranged for engagement with complementary drive gears 70,72,74,76 in a lens pattern generator 78 partially illustrated in FIG. 10 in schematic form to advance and index the blank 10 along a travel path 80 in the direction of arrow 82. The lens pattern generator may be of any type but preferably is of the type disclosed in the above mentioned copending patent application entitled LENS PATTERN GENERATOR. A series of teeth forming each of the rack gears 30,32 extend between the end edge 22 and the end edge 24 of the blank 10. The teeth of the rack gear 30 located at one side edge 16 are in registry with the teeth of the rack gear 32 located at the other side edge 18 and preferably, the first axis 26 passes through the center of the center tooth space 34,36 of the teeth comprising rack gears 30,32 respectively. When a number of similar blanks 10,10 are connected together to form a chain as described below, the pitch of the teeth comprising the rack gears 30,32 is continuous across the hings space between two immediately adjacent and interconnected blanks in a chain.

Figure 10:
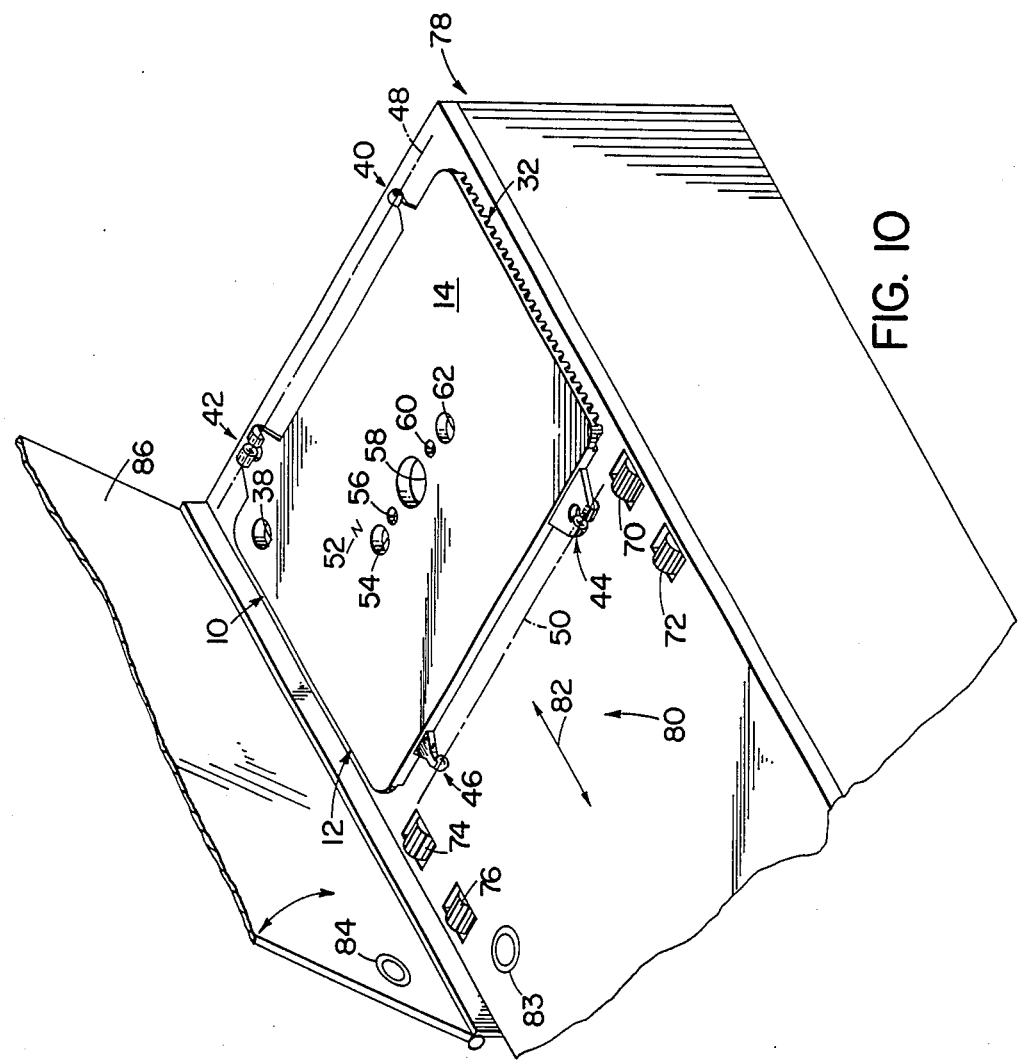
FIG. 10 is a view of the blank of FIG. 1 shown at a position along the travel path of a lens pattern generator wherein the generator is partially shown in a somewhat diagrammatic view.

The blank 10 also includes a locating opening 38, shown circular in the illustrated embodiment extending through the body 12 between the top face 14 and the bottom face 20 and through which opening 38 an energy beam for example, light produced by the lens pattern generator 78, may pass for sensing and detection by a sensing device within the generator. As illustrated in FIG. 10, the generator 78 includes a sensor 83 and a light source, such as an LED 84. The LED 84 is mounted in the lid 86 of the generator 78 and when the lid is closed the LED 84 is in registry with the sensor 83. The generator 78 contains circuitry which is sensitive to and responsive to the detection of the light beam when the LED 84, sensor 83 and locating opening 38 in the blank 10 are in registry to cause the generator to cut a pattern having a conventional nasal side orientation. The LED 84 and sensor 83 also detect an edge of a blank for controlling the drive gears 70,72,74,76 to advance and locate the blank 10 along the travel path 80 as the blank passes in the space between the lid 86 and the travel path surface. The opening 38 is located substantially in one corner of the body and at a predetermined distance from each of the end edges 22,24 and from each of the side edges 16,18 and indicates the nasal side of a blank.

In addition to the opening 38, the blank 10 is marked with idicia to identify the nasal side of the blank so that when a pattern is cut from the blank, the optician or lens grinder can identify by the appearance of the indicia the proper orientation of the pattern surface to achieve one or the other of a respective right and left side pattern associated with the eyeglass frame right and left lens openings. In the preferred embodiment, a letter N is slightly embossed or raised on the top face 14 to provide the desired nasal side identifying mark.

The blank 10 also contains a number of circular openings or holes 54,56,58,60 and 62 arranged symmetrically about the axis 28 and in alignment along the axis 26 in a spaced apart, standard lens chucking pattern format. The spacing of the chucking holes 54,56,58,60 and 62 and their respective diameters are well known to those skilled in the art. A standard chucking hole pattern is provided so that a pattern cut from the blank 10 can be held in a conventional chuck generally associated with lens edging apparatus used in the eyeglass industry. The hole 58 coincides with the geometrical or boxing center of the blank when the standard box measurement system is used. The hole 58 will also be in the center of a pattern cut from the blank and corresponds to a central point of rotation of a pattern used as a guide to generate a corresponding shape of a lens periphery edged or contoured by an edge contouring apparatus.

Figure 11:
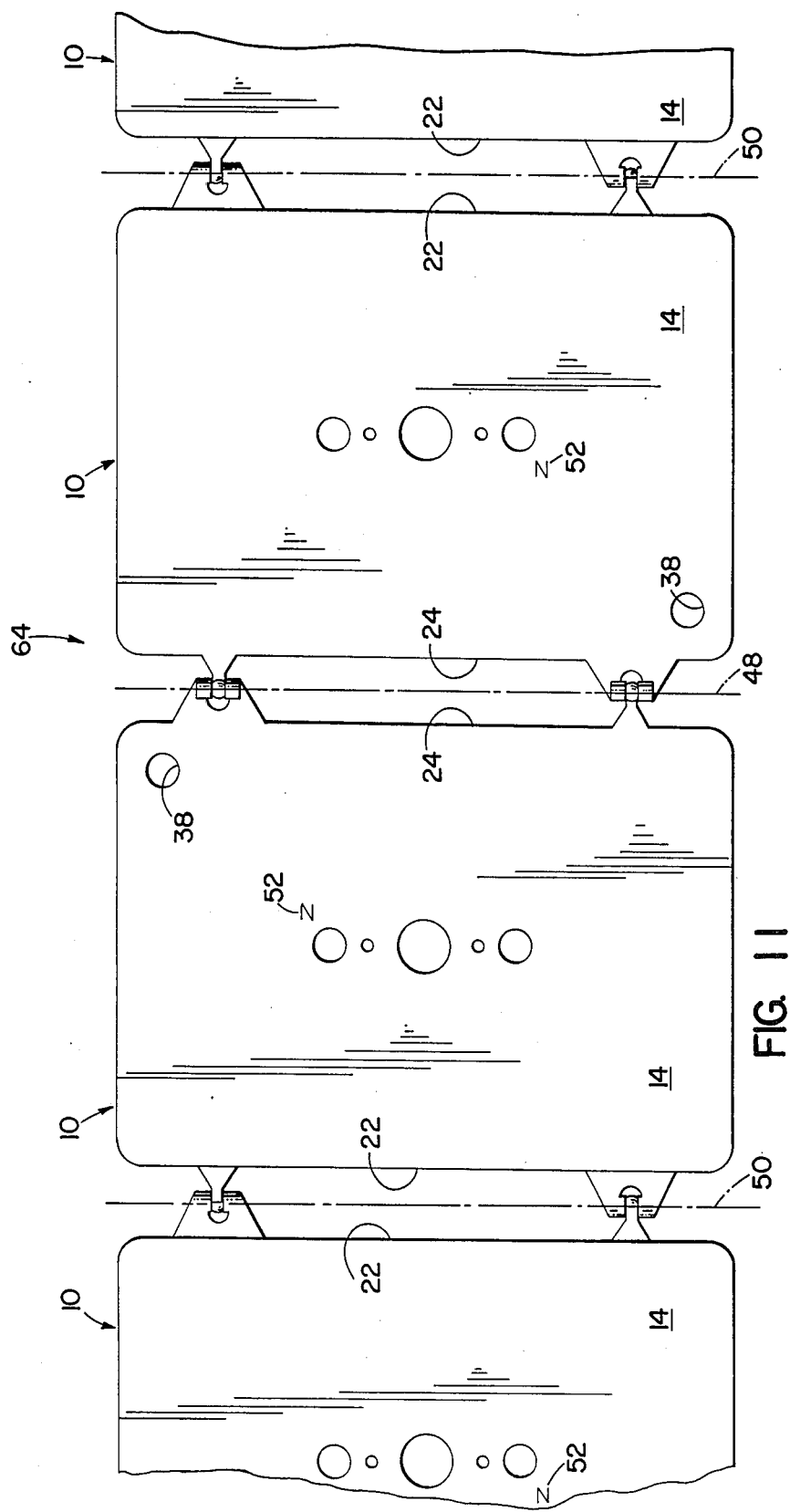
FIG. 11 is a top plan view showing a number of similar blanks connected together to form a chain.

Turning now to FIG. 11, a number of similar blanks 10,10. are shown connected together in an alternating end edge 24-to-end edge 24 and end edge 22-to-end edge 22 fashion to form a chain 64. As can be seen in FIG. 11, the individual blanks 10,10 are connected together in such a way to provide a novel alternating arrangement so that the nasal side of the blank, as identified by the indicia 52 (the letter N in the preferred embodiment), alternates from one side to the other side of the chain as does the locating opening 38.

When the blank 10 of the present invention is used in a lens pattern generator, such as the one disclosed in the above-mentioned copending application, coordinate information describing the shape and size of a lens opening, such as the coordinate information generated for example, by the tracer apparatus disclosed in the above-mentioned copending application, is sent directly to the lens pattern generator and without alteration or modification for blank orientation. The generator 78 is designed to look for a locating opening to be present at the generator sensors for every other blank fed to the generator in order to cut a standard pattern with its nasal side identification properly oriented.

Recalling from above that the pivot axis 48 of the hinge members 40,42 located on end edge 24 is coplanar with the top face 14 and the pivot axis 50 of the hinge members 44,46 located on the other end edge 24 is coplanar with the bottom face 20, it is seen that when the similar blanks 10,10 of the chain 64 are extended along a flat surface, the respective top faces 14,14 of the blanks 10,10 lie in one common plane and the respective bottom faces 20,20 of the blanks 10,10 lie in a second common plane. This feature facilitates the feeding and indexing of the blanks 10,10 to a lens pattern generator such as the one mentioned above. Because the blanks 10,10 of the chain 64 lie substantially flat on the surface of the travel path 80, a substantially flat and continuous rack gear having a constant pitch is presented to the drive gears of the generator with an advance blank 10 in a chain engaging with the gears 72,76 and a following adjacent blank 10 engaging with gears 70,74. Consequently, an exact spacing is maintained between adjacent blanks as they are fed along the travel path 80 of the generator 78.

Figure 12:
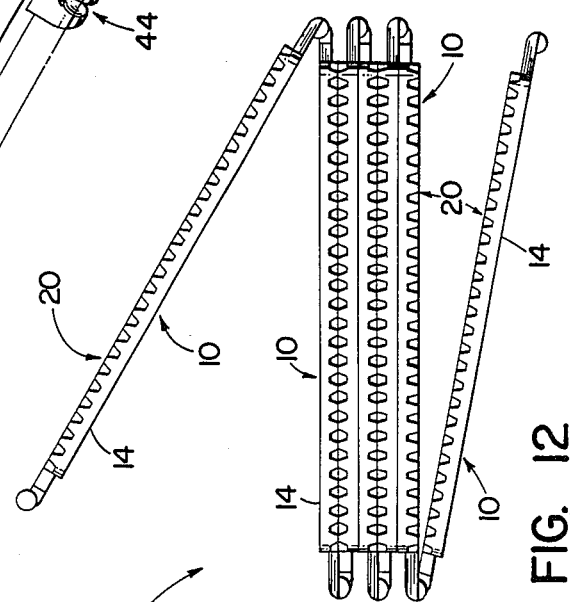
FIG. 12 is a side view showing a chain of blanks embodying the present invention folded in an alternating top face-to-top face and bottom face-to-bottom face arrangement to form a compactly packaged bundle.
Figure 8:
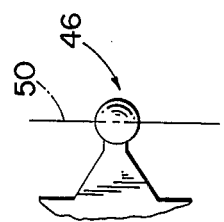
FIG. 8 is an exploded view of the socket forming part of the ball and socket hinge arrangement used to connect similar blanks together.
Figure 9:
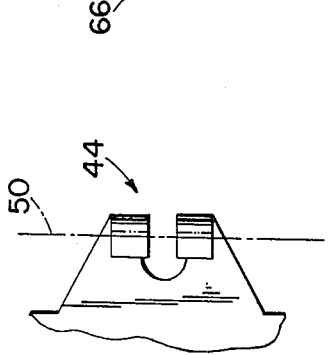
FIG. 9 is an exploded view of the ball forming part of the ball and socket hinge arrangement used to connect similar blanks together.

Referring to FIG. 12, a compactly packaged bundle is shown therein and designated 66. As shown in FIG. 12, the end edge 24-to-end edge 24 and end edge 22-to-end edge 22 arrangement permits the blanks 10,10 of a chain 64 to be fan-folded in an alternating top face 14-to-top face 14 and bottom face 20-to-bottom face 20 bundling arrangement. The bundling arrangement allows the blanks 10,10 to be drawn in a continuous fashion directly from a package or shipping container for automatic feeding to a lens pattern generator without operator intervention once the initial blank in the chain is staged along the travel path. In addition, packaging the blanks as a compact bundle provides protection from breakage or damage during shipment and handling.

The blank 10 is preferably made of a material or composition that is easily cuttable or otherwise formable into a lens pattern. In addition, the material must not be subject to deformation during the cutting process to insure that the pattern is an accurate replication of the size and shape of the frame lens opening with which the pattern is associated and described by the corresponding coordinate information. In the preferred embodiment of the invention, the composition of the blank 10 is a high density polyethylene; however, other equivalent compositions well known to those skilled in the art may be used. One advantage to using high density polyethylene or an equivalent composition is the blank may be produced in large quantities using injection molding techniques.

A blank from which a lens pattern is cut has been described in a preferred embodiment. However, it will be understood that numerous changes and modifications may be made by those skilled in the art. For example, similar blanks may be connected together by continuous tabs between blanks and located along adjacent edges wherein the tab between two edges has a weakened portion about which the adjacently connected blanks rotate relative to one another to form the top face-to-top face and bottom face-to-bottom face bundling arrangement. Therefore, the invention has been described by way of illustration rather than limitation.

We claim:

1. A blank from which a lens pattern is cut, said blank comprising:
   a relatively thin body having generally parallel top and bottom major faces of substantially rectangular shape, said body also having first and second side edges parallel to and opposite one another and first and second end edges parallel to and opposite one another and perpendicular to said side edges;
   a series of drive elements located along each of said first and second side edges of said body and integral with one of said top and bottom major faces, so that said drive elements do not extend completely through said body between said top and bottom surfaces;
   first hinge means located adjacent said first end edge, and
   said second hinge means located adjacent said second end edge;
   said first hinge means being arranged for cooperation with another said first hinge means of a first similar blank and said second hinge means being arranged for cooperation with another said second hinge means of a second similar blank whereby said blank and said first and second blanks are connected with said first hinge means of said blank connected to first hinge means of said first blank and said second hinge means of said blank connected to said second hinge means of said second blank so that like end edges are adjacent one another when said blank and said first and second blanks are connected.

2. A blank as defined in claim 1 wherein the drive elements of each of said series of drive elements are the teeth of a rack gear.

3. A blank as defined in claim 2 wherein each of said series of rack gear teeth extends between said two end edges.

4. A blank as defined in claim 3 wherein each of said series of rack gear teeth is molded in the margin of said bottom face and each tooth of said series projects normal to said bottom face such that the top of each tooth lies in a substantially common plane with said bottom face.

5. A blank as defined in claim 1 wherein said first hinge means includes a male hinge member and a female hinge member arranged symmetrically about a first point on said first end edge, said first point being located midway between said side edges, said male and female hinge members having a pivot axis substantially parallel to said first end edge and extending through the pivot point of said male and female hinge members.

6. A blank as defined in claim 5 wherein said second hinge means includes a male hinge member and a female hinge member arranged symmetrically about a second point on said second end edge, said second point being located midway between said side edges, said male and female hinge members having a pivot axis substantially parallel to said second end edge and extending through the pivot point of said male and female hinge members, said male hinge member associated with said first end edge being located opposite said female hinge member associated with said second end edge and said female hinge member associated with said first end edge being located opposite said male hinge member associated with said second end edge.

7. A blank as defined in claim 6 wherein said male and female hinge members are located adjacent an associated end edge such that a first plane passing through the pivot axis of said hinge members associated with said first end edge and the pivot axis of said hinge members associated with said second end edge is inclined with respect to said top and bottom faces.

8. A blank as defined in claim 7 wherein a second plane passing through the pivot axis of said hinge members located adjacent said first end edge is substantially coplanar with one of said top and bottom faces and a third plane passing through the pivot axis of said hinge members located adjacent said second end edge is substantially coplanar with the other of said top and bottom faces.

9. A blank as defined in claim 8 wherein said second plane is coplanar with said bottom face and said third plane is coplanar with said top face.

10. A blank as defined in claim 8 wherein said hinge members located adjacent one of said first and second end edges are arranged for snap engagement with said hinge members located adjacent one of said first and second end edges of a similar blank.

11. A blank as defined in claim 9 wherein said hinge members located adjacent said first end edge of one blank cooperate with said hinge members located adjacent said first end edge of a similar advance blank located adjacent said first end edge to permit said blank and said similar advance blank to rotate relative to one another about said pivot axis of said hinge members associated with said first end edge and said second hinge members located adjacent said second end edge of said one blank cooperate with said hinge members located adjacent said second end edge of a similar rear blank located adjacent said second end edge to permit said blank and said similar rear blank to rotate relative to one another about said pivot axis of said hinge members associated with said second end edge.

12. A blank as defined in claim 1 further including means for chucking the blank and a pattern cut from the blank, said chucking means defining a number of openings extending through the body between the top and bottom faces, said openings being aligned along a first axis extending between said first and second side edges parallel to and substantially midway between said first and second end edges and said openings being located symmetrically about a second axis extending between said first and second end edges parallel to and substantially midway between said first and second side edges, said openings being circular and spaced apart from one another in conformance with a standard chucking format whereby said blank is engageable with holding elements associated with a conventional chuck used with lens edging apparatus.

13. A blank as defined in claim 1 further including indicia means for identifying one side of said body as the nasal side, said indicia means being a predetermined marking embossed on said top face of said body at said identified nasal side whereby said identified nasal side corresponds to the nasal side of a pattern cut from said blank.

14. A blank as defined in claim 1 further including nasal locating means for determining the orientation of a nasal side of said blank, said nasal locating means comprising means defining an opening extending through said body between said top and bottom faces and substantially in one corner of said body at a predetermined distance from said first and second end edges and from said first and second side edges.

15. A blank for use in a lens pattern generator and from which a lens pattern is cut wherein said generator includes drive means for moving the blank along a travel path and sensing means for sensing the blank as it moves along the travel path, said blank comprising:
a relatively thin body having generally parallel top and bottom major faces of substantially rectangular shape, said body also having first and second side edges parallel to and opposite one another and first and second end edges parallel to and opposite one another and perpendicular to said side edges;
a series of drive elements located along each of said first and second side edges of said body, said drive elements engaging with the drive means of the pattern generator for moving the blank in a direction parallel to its side edges.
first hinge means located adjacent said first end edge;
second hinge means located adjacent said second end edge, and
nasal locating means cooperating with the sensing means associated with the pattern generator for determining the orientation of a nasal side of said blank at a predetermined position along the travel path in the pattern generator.

16. A blank as defined in claim 15 wherein the drive elements of each of said series of drive elements are the teeth of a rack gear.

17. A blank as defined in claim 16 wherein each of said series of rack gear teeth extends between said two end edges.

18. A blank as defined in claim 17 wherein each of said series of rack gear teeth is molded in the margin of said bottom face and each tooth of said series projects normal to said bottom face so that the top of each tooth lies in a substantially common plane with said bottom face.

19. A blank as defined in claim 15 wherein said nasal locating means comprises means defining an opening extending through said body between said top and bottom faces, said opening being substantially in the vicinity of one corner of said body at a predetermined distance from said first and second end edges and from said first and second side edges, said opening permitting a beam of energy produced by means associated with the sensing means in the generator to pass therethrough for detection by other means associated with the sensing means in the generator when said opening and the energy beam are in registry.

20. A blank as defined in claim 15 wherein said first hinge means located adjacent said first end edge of one blank is arranged for cooperation with said first hinge means located adjacent said first end edge of a similar advance blank located adjacent said first end edge to permit said blank and said similar advance blank to rotate relative to one another about an axis parallel to said first end edge, and said second hinge means located adjacent said second end edge of said one blank is arranged for cooperation with said second hinge means located adjacent said second end edge to permit said blank and said similar rear blank to rotate relative to one another about an axis parallel to said second end edge.

21. A blank as defined in claim 20 wherein said first hinge means located adjacent said first end edge and said second hinge means located adjacent said second end edge are arranged so that a first plane passing through said pivot axis associated with said first hinge means and through said pivot axis associated with said second hinge means is inclined with respect to said top and bottom faces.

22. A blank as defined in claim 21 wherein a second plane passing through said pivot axis of said hinge means located adjacent said first end edge is substantially coplanar with one of said top and bottom faces and a third plane passing through said pivot axis of said hinge means located adjacent said second end edge is substantially coplanar with the other of said top and bottom faces.

23. A blank as defined in claim 22 wherein said blank first end edge is located adjacent said first end edge of said similar advance blank and said blank second end edge is located adjacent said second end edge of said similar rear blank such that said bottom face of said blank lies in a common plane with said bottom face of said similar advance and said similar rear blanks whereby said rack gear teeth maintain a continuous pitch across a gap between two adjacently located edges and move with respect to the drive means of the generator in continuous contact with the drive means as said blank and said similar advance and rear blanks move along the travel path.

24. A chain of blanks for continuous feeding to a lens pattern generator of the general type including drive means for moving the blanks along a travel path to a work station and sensing means for sensing a blank in the chain of blanks and from which of each blanks a lens pattern is cut, said chain comprising:
a number of rectangularly shaped blanks, each of said blanks including:
(a) a relatively thin body having generally parallel top and bottom major faces, said body also having first and second side edges parallel and opposite one another and first and second end edges parallel and opposite one another and perpendicular to said side edges;
(b) a series of drive elements located along each of said first and second side edges of said body, said drive elements engaging with the drive means of the pattern generator for indexing and advancing said blanks in said chain along the travel path in the generator;
(c) nasal locating means cooperating with the sensing means associated with the pattern generator for determining the orientation of a nasal side of a blank in said chain at a predetermined position along the travel path;
(d) first hinge means located adjacent said first end edges;
(e) second hinge means located adjacent said second end edge;

said first hinge means located adjacent said first end edge of one blank being arranged for cooperation with said first hinge means located adjacent said first end edge of a similar advance blank located adjacent said first end edge to permit said blank and said similar advance blank to rotate relative to one another about an axis parallel to said first end edge, and said second hinge means located adjacent said second end edge of said one blank being arranged for cooperation with said second hinge means located adjacent said second end edge of a similar rear blank located adjacent said second end edge to permit said blank and said similar rear blank to rotate relative to one another about an axis parallel to said second end edge, and said first hinge means being located adjacent said first end edge and said second hinge means being located adjacent said second end edge such that a first plane passing through said axis associated with said first hinge means and through said axis associated with said second hinge means is inclined with respect to said top and bottom faces and a second plane passing through said first hinge means axis is substantially coplanar with one of said top and bottom faces and a third plane passing through said second hinge means axis is substantially coplanar with the other of said top and bottom faces.

25. A chain of blanks as defined in claim 24 wherein said one blank first end edge is located adjacent said first end edge of said similar advance blank and said one blank second end edge is located adjacent said second end edge of said similar rear blank such that said bottom face of said one blank lies in a common plane with said bottom face of said similar advance blank and said bottom face of said similar rear blank when said blanks are extended edge-to-edge along a reference plane.

26. A chain of blanks as defined in claim 24 wherein said chain is foldable into a compact package, said blanks being disposed into an alternating top face-to-top face and bottom face-to-bottom face arrangement, said one blank and said similar advance blank being rotated into top face-to-top face contact when said hinge means axis associated with said hinge means located adjacent one of said first and second end edges is in a plane substantially coplanar with said top faces of said one blank and said similar advance blank and said one blank and said similar rear blank being rotated into bottom face-to-bottom face contact when said hinge means axis associated with said hinge means located adjacent the other of said first and second end edges is in a plane substantially coplanar with said bottom faces of said one blank and said similar rear blank.

27. A chain of blanks as defined in claim 25 wherein said first hinge means and said second hinge means of said one blank are arranged for snap engagement with said first hinge means and said second hinge means of a similar blank located adjacent said one blank.

28. A chain of blanks as defined in claim 25 wherein said first hinge means of said one blank and said similar advance blank comprising first tab means connecting said one and similar advance blanks, said first tab means having a weakened portion to permit said one and similar advance blanks to rotate relative to one another, said second hinge means of said one blank and said similar rear blank comprising second tab means connecting said one and similar rear blanks, said second tab means having a weakened portion to permit said one and similar rear blanks to rotate relative to one another.

* * * * *